June 27, 1939.  F. B. A. PRINSEN  2,163,737
AUTOMATIC DIAPHRAGM WORKING BY MEANS OF A PHOTOELECTRIC
CELL, A LIGHT-SENSITIVE ELEMENT, OR THE LIKE
Filed Sept. 30, 1933

F. B. A. Prinsen
INVENTOR

By: Marks & Clerk
Attys.

Patented June 27, 1939

2,163,737

UNITED STATES PATENT OFFICE 2,163,737

AUTOMATIC DIAPHRAGM WORKING BY MEANS OF A PHOTOELECTRIC CELL, A LIGHT-SENSITIVE ELEMENT, OR THE LIKE

Frederik Berthus Archibald Prinsen, Scheveningen, Netherlands

Application September 30, 1933, Serial No. 691,721 In the Netherlands October 4, 1932

3 Claims. (Cl. 95—64)

The invention relates to a diaphragm for photographic and film cameras adjusting automatically in the right proportion to the light intensity of the object to be taken, by means of a photoelectric cell, a light sensitive element (Sperrschichtzelle) or the like.

Devices have already been proposed whereby photoelectric cells are used for adjusting the diaphragm. Hereby, however, an amplifier is used, supplying the current which is large enough to move an iris-diaphragm, by means of a motor or any other dynamical system, over tooth wheels or levers. The said systems need at the same time a source of current which has to supply the electric energy for the amplifier and the motor. It is obvious that the said systems are not adapted to be applied to amateur cameras. At most they may be applied to studios with stationary cameras.

The invention meets the said drawbacks by this that the diaphragm is constructed so that the current supplied by a photoelectric cell or the like already suffices for obtaining the desired adjusting.

Figure 1:
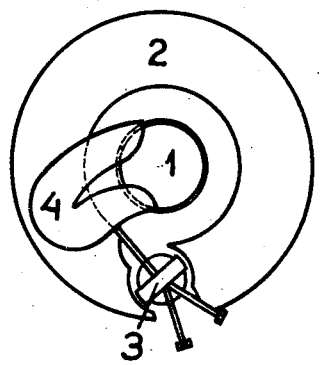
Figure 2:
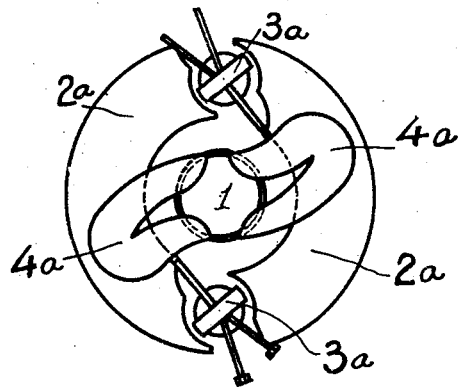
Figure 3:
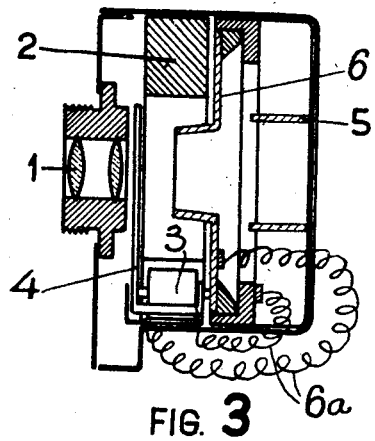

In the accompanying drawing:

Figures 1 and 2 are front elevations of two forms of automatic diaphragms constructed in accordance with the invention, and Figure 3 is a section of Fig. 1.

Referring to the drawing in detail, the diaphragm consists of a tapering cleft made in a shutter 4. This shutter is mounted on a balanced and movable dynamic system constituted, for instance, by a magnet 2 and a coil 3 pivoted on trunnions. Very light materials are used, whereby it is possible to compose a device which is so very sensitive that a current of a few microamperes is sufficient for adjusting. The system can be returned into its position of rest by very thin spiral springs.

By this construction the current, which is directly supplied when a photoelectric cell 6 or the like is exposed to light, suffices for obtaining the desired adjustment of the diaphragm through its connections 6a with the coil 3, even in case of a very small light sensitive element of a diameter of 13 mm. which is screened so that only the light reflected by the object to be photographed will strike the cell.

The system can be built so that the magnet 2 of the dynamical system encloses the objective.

A considerable advantage is effected by a device wherein two slitted diaphragms working in opposite directions are arranged in front of the objective by which the adjusted aperture is always kept more in the centre, as shown in Fig. 2.

The dynamic systems may be arranged oppositely in one and the same magnet.

The light sensitive element may be ring-shaped so that it can be mounted also around the objective.

By arranging filters or a light-shutter, which may be closed to a greater or less extent, in front of the photoelectric cell or light-sensitive element 6 the diaphragm adjustment may be adapted to various sorts of photographic material.

The said diaphragm-adjustment may also be adapted by arranging switchable resistances in the circuit or by field variations in the magnet.

Instead of a slitted diaphragm equivalent other diaphragms, e. g., grid-diaphragms may also be used.

By using a magnet 2 of which a part of the poles is milled away, the ratio of deflection in the last part (that is to say near the small apertures) may be decreased, by which a more logical slitted-diaphragm may be obtained.

Fig. 1 represents an objective enclosed by a magnet 2 in which a dynamical system 3 is arranged. The slitted diaphragm 4 is rigidly connected to the moving coil of the dynamical system.

Fig. 2 represents an objective provided with two slitted diaphragms 4a working in opposite direction, the dynamical systems 3a are arranged in the same magnet which in this case is composed of two parts 2a.

Fig. 3 represents the cross-section of an objective 1 with dynamical system 3 and slitted diaphragm 4 whereas an annular light-sensitive element 6 provided with a screening-device 5 for the direct light is also arranged.

I claim:

1. In a photographic camera, a photographic object lens, a device for the control of light entering the camera through said object lens, a photoelectric cell, a moving coil instrument deriving current from the photoelectric cell, means whereby the said device is controlled by the moving coil instrument, and a magnet for the production of a magnetic field for the moving coil instrument, the said photo-cell surrounding the optical axis of the photographic object lens, said light control device including at least one pivoted diaphragm element having a substantially hyperbolic curved slit tapering in the direction of movement of said element.

2. In an automatic diaphragm for photographic cameras, a diaphragm element, means mounting said element for pivotal movement, means including a photoelectric cell for controlling the movement of said diaphragm element, said diaphragm element forming the displaceable portion of a rotary coil meter of the d'Arsonval type energized by the photocell-current, said diaphragm element having a slit of substantially hyperbolic form.

3. In an automatic diaphragm for photographic cameras, a diaphragm element, means mounting said element for pivotal movement, means including a photoelectric cell for controlling the movement of said diaphragm element, said diaphragm element forming the displaceable portion of a rotary coil meter of the d'Arsonval type energized by the photocell-current, said diaphragm element having a slit of substantially hyperbolic form tapering in the direction of movement of said element.

FREDERIK BERTHUS
ARCHIBALD PRINSEN.